US006269731B1

(12) United States Patent
Gautier et al.

(10) Patent No.: US 6,269,731 B1
(45) Date of Patent: Aug. 7, 2001

(54) PNEUMATIC-SERVOMOTOR WITH FORCE-CONTROLLED BOOSTING

(75) Inventors: Jean-Pierre Gautier, Aulnay-Ss-Bois; Cedric Leboisne, Paris; Ulysse Verbo, Aulnay-Ss-Bois; Raphael Medina, Pierrefite S/Seine; Philippe Richard, Chelles, all of (FR)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/308,499
(22) PCT Filed: Apr. 15, 1999
(86) PCT No.: PCT/FR99/00938
 § 371 Date: May 19, 1999
 § 102(e) Date: May 19, 1999
(87) PCT Pub. No.: WO99/55569
 PCT Pub. Date: Nov. 4, 1999

(30) Foreign Application Priority Data

Apr. 24, 1998 (FR) .................................................. 98 05113

(51) Int. Cl.[7] ..................................................... F15B 9/10
(52) U.S. Cl. ............................................................ 91/369.2
(58) Field of Search ............................................. 91/369.2

(56) References Cited

U.S. PATENT DOCUMENTS

| 5,884,548 | * | 3/1999 | Ando et al. | .......................... | 91/369.2 |
| 5,893,316 | * | 4/1999 | Inoue et al. | .......................... | 91/369.2 |
| 5,907,990 | * | 6/1999 | Satoh | ................................... | 91/369.2 |
| 5,943,937 | * | 8/1999 | Endo | .................................. | 91/369.2 |

FOREIGN PATENT DOCUMENTS

| 2092251 | * | 8/1982 | (GB) | ................................... | 91/369.2 |
| 4-257760 | * | 9/1992 | (JP) | .................................... | 91/369.2 |

\* cited by examiner

*Primary Examiner*—John E. Ryznic
(74) *Attorney, Agent, or Firm*—Leo H McCormick, Jr.; Warren Comstock

(57) ABSTRACT

A pneumatic booster operated by a plunger (8) located in a piston (5) with a rear section (82) which operates a valve (91,92,93) to develop a force on the piston (5) to apply a boost force to force-transmission members (12,14). The plunger (8) has a first section (81) connected to the rear section (82) by a spring (15). The front section (81) and the force-transmission members (12,14) defining a retention assembly (16,17) for securing the front section (81) to the piston (5) when a boost force exceeds a predetermined threshold while the plunger (8) is in a maximum actuating position to allow for extended actuation of the booster following a sharp braking action.

7 Claims, 5 Drawing Sheets

PNEUMATIC-SERVOMOTOR WITH FORCE-CONTROLLED BOOSTING

The present invention relates to a pneumatic brake-booster.

More specifically, the invention relates to a pneumatic brake-booster comprising: a rigid casing; a moving partition delimiting, in leaktight fashion, a front chamber and a rear chamber inside the casing, the front chamber in operation being subjected to a first pressure and the rear chamber being selectively connected to the front chamber or subjected to a second pressure higher than the first; a pneumatic piston moving with the moving partition; an operating rod moving in the piston as a function of an input force selectively exerted in an axial actuating direction orientated towards the front chamber, and of a return force exerted by a main spring in an axial return direction which is the opposite of the axial actuating direction, the return force urging the operating rod into a return position, and the input force urging the operating rod into an intermediate actuating position or into an extreme actuating position, depending on whether the input force is applied at a rate that is lower or higher than a determined limiting rate; a plunger housed in the piston and driven along by the operating rod; a three-way valve itself comprising an annular seat borne by a rear section of the plunger, this valve connecting the rear chamber to the front chamber when the operating rod is in the position of rest, and subjecting the rear chamber to the second pressure when the operating rod is in one of its actuating positions; force-transmission means capable of receiving and of transmitting at least a boost force exerted by a front face of the piston when the valve subjects the rear chamber to the second pressure, these force-transmission means themselves comprising reaction means capable of reacting against the input force with a reaction force that depends on the boost force.

BACKGROUND OF THE INVENTION

Devices of this type are well known in the prior art, as illustrated, for example, in patent documents U.S. Pat. No. 3,470,697, FR-2,532,084 and FR-2,658,466.

Recent research has shown that a good many drivers, when confronted with an emergency braking situation, underestimate the risks actually involved and, having braked sharply, release their braking effort under circumstances in which, on the contrary, it is absolutely essential that they maintain a substantial braking effort in order to avoid the accident.

This observation has led to the development of various solutions in an attempt to alleviate any possible shortcomings in the behaviour of an inexperienced or panic-stricken driver.

SUMMARY OF THE INVENTION

The invention falls within this context and is intended to provide a simple solution to the problem of maintaining a substantial braking force after a violent braking action.

To this end, the booster of the invention which in other respects is in accordance with the definition given in the above preamble, is essentially characterized in that the plunger comprises a front section connected to the rear section by a secondary spring exerting, between the front and rear sections, a mutual-contact force that is lower than the return force, and in that the front section and the force-transmission means comprise respective reversible retention means capable of securing the front section to the piston when the boost force exceeds a determined threshold while the operating rod is in its extreme actuating position.

In one possible embodiment of the invention, the retention means comprise an elastic annular layer axially subjected to the boost force, this layer having an axial thickness and an inside diameter which are smaller, the higher the boost force.

For example, reaction means comprise a reaction disc made of elastomeric material, the retention means comprise a rigid disc constituting a front face of the front section of the plunger, and the annular layer consists of a thickening of the reaction disc which delimits, in the reaction disc, a housing capable of trapping the rigid disc when the boost force exceeds the determined threshold while the operating rod is in its extreme actuating position.

In this case, the housing and the rigid disc preferably have complementary frustoconical shapes.

The retention means may also comprise a shoulder with the external shape, for example at least partially cylindrical, of the front section.

In this case, the retention means advantageously comprise a rigid insert located in the elastic annular layer and interacting with the shoulder with the external shape of the front section in order to combine the front section with the piston when the boost force exceeds the determined threshold while the operating rod is in its extreme actuating position.

In other embodiment of the invention, the retaining means comprise a rigid sleeve arranged inside an elastic sleeve wich delimits a housing capable of trapping the rigid sleeve when the boost force exceeds the determined theshold while the operating rod is in its extreme actuating position.

Other features and advantages of the invention will emerge clearly from the description thereof given hereafter by way of non-limiting indication, with reference to the appended drawings.

DETAILED DESCRIPTION OF THE INVENTION

Figure 1:
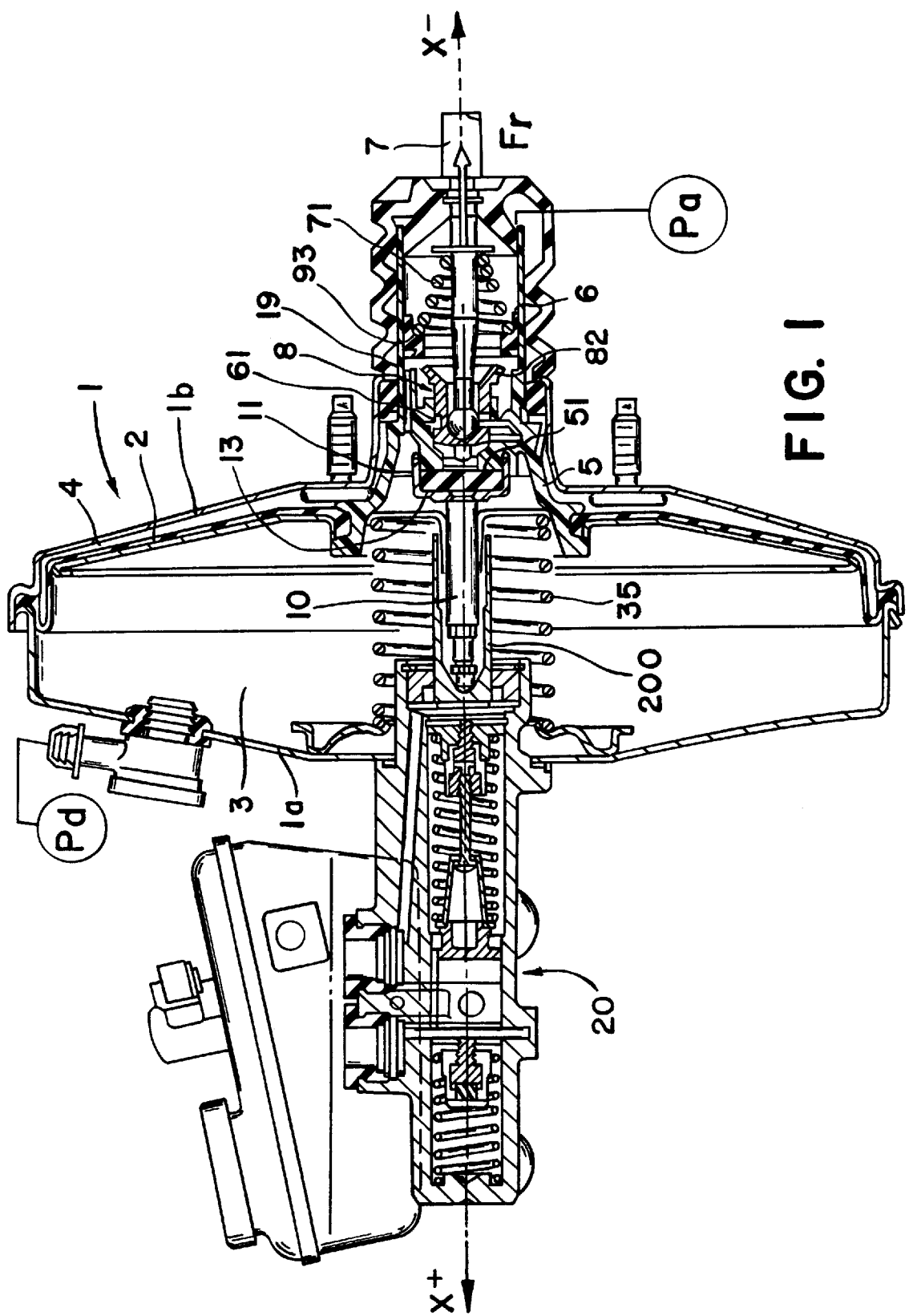
FIG. 1 is a sectioned view of a booster in accordance with a first embodiment of the invention.

A pneumatic booster in accordance with the invention comprises, in a way known per se, a front shell $1a$ and a rear shell $1b$ which together form a rigid casing 1.

A moving partition 2 divides the inside of this rigid casing 1 in leaktight manner and therein delimits a front chamber 3 and a rear chamber 4, the front chamber 3 being, when in operation, subjected to a first, relatively low, pressure Pd.

A pneumatic piston 5 moves with the moving partition 2 and has a hub 6 mounted to slide in an opening 19 of the casing 1.

The booster is operated by an operating rod 7 that can move in the hub 6 between a position of rest (FIGS. 1, 2, 5, 6 and 9) and an extreme actuating position (FIGS. 3 and 7), the position of this rod in the hub depending, in particular, both on an input force Fe which is applied to this rod, in an axial actuating direction X+ by the brake pedal (not depicted), on the rate at which this input force Fe is applied, on a return force Fr exerted in the opposite direction X– by a main return spring 71, and on a reaction force in the same direction as the return force.

When the input force Fe is applied slowly to the operating rod 7, the latter adopts an intermediate actuating position somewhere between its position of rest (FIGS. 1, 2, 5, 6 and 9) and its extreme actuating position (FIGS. 3 and 7), the operating rod reaching its extreme actuating position only when the input force Fe is applied at a rate higher than a given limiting rate.

A plunger 8, carried along by the operating rod 7, is mounted to slide in a bore 61 in the hub 6, to control the status of a three-way valve 9.

This valve 9 essentially consists of a stationary annular seat 91 formed at the internal periphery of the hub 6, of a moving annular seat 92, concentric with the stationary seat 91 and borne by a rear section 82 of the plunger 8, and of a tubular shutter 93, which is itself concentric both with the plunger and with the hub.

The tubular shutter 93 has an annular front shut-off face intended to interact, according to the position of the plunger 8, either with the moving seat 92 or with the stationary seat 91.

When the booster is at rest (FIGS. 1, 2, 5, 6 and 9), the shutter 93 presses against the moving seat 92 and isolates the rear chamber 4 from a source of pressure, generally consisting of the atmosphere, which delivers a pressure Pa higher than the pressure Pd to which the front chamber 3 is subjected.

By contrast, when an input force Fe appreciably higher than the return force Fr of the spring 71 is exerted on the rod 7, this force Fe causes the plunger 8 to move in the actuating direction X+, so that the shutter 93 comes away from the moving seat 92 and presses on the stationary seat 91 (FIG. 3), the rear chamber 4 thus finding itself subjected to the pressure Pa.

The entry of air into the rear chamber pushes the moving partition 2 back in the actuating direction X+ and generates a boost force Fa which is exerted on the front face 51 of the piston 5.

The input force Fe and the boost force Fa are applied together to the force-transmission members which uses them to actuate the master cylinder 20, these force-transmission members comprising reaction members capable of reacting against the input force Fe with a reaction force that depends on the boost force Fa.

The specific nature of the force-transmission and reaction members varies with the type of booster in question, but the present invention can be implemented irrespective of the type of reaction used in the booster to which it is fitted.

For example, FIG. 1 illustrates a booster which, in a known way, uses a reaction disc 13 made of an elastomeric material housed in a cup 11 and which receives both the input force Fe transmitted by the plunger 8 and the boost force Fa exerted by the front face 51 of the pneumatic piston 5.

The reaction disc 13 reacts against the input force Fe with a reaction force which varies with the boost force Fa, and the cup 11, which is joined to a push rod 10, transmits to the primary hydraulic piston 200 of the master cylinder 20 the resultant of these forces, of the return force Fr and of the elastic force of a piston-return spring 35.

Figure 5:
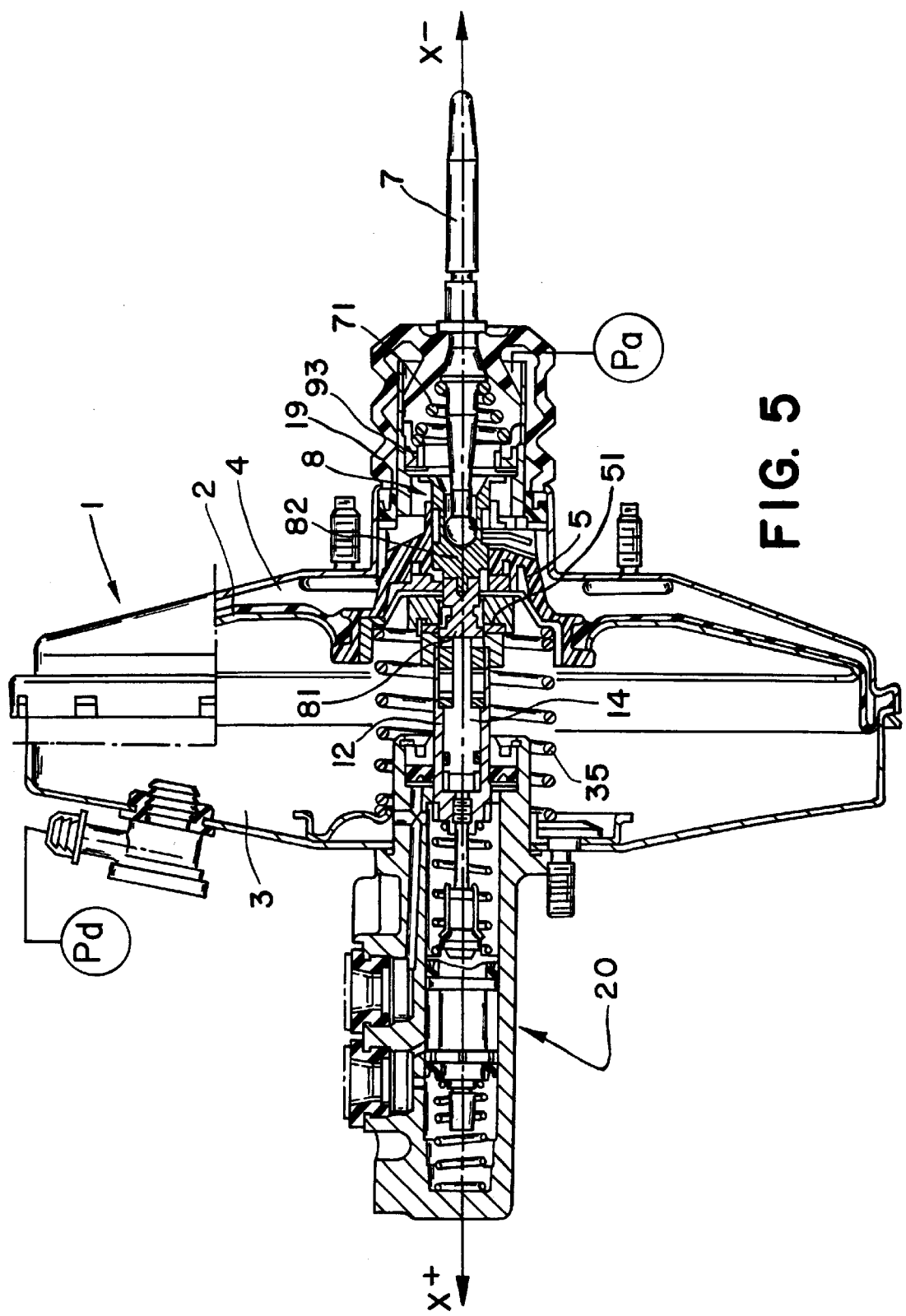
FIG. 5 is a sectioned view of a booster in accordance with a second embodiment of the invention.

FIG. 5 by contrast illustrates a so-called "hydraulic reaction" booster, also known, such a booster using a hydraulic reaction piston 14 which receives the input force Fe decreased, in particular, by the return force Fr, and which slides in a hydraulic cylinder 12 designed to receive the boost force Fa exerted by the front face 51 of the pneumatic piston 5.

According to the invention, the plunger 8 has a front section 81 connected to the rear section 82 by a secondary spring 15, while the front section 81 of the plunger and the force-transmission members comprise respective reversible retention means capable of securing the front section 81 to the piston when the boost force Fa exceeds a determined threshold S while the operating rod is in its extreme actuating position.

More specifically, the secondary spring 15, which for example consists of a compressively preloaded helical spring, brings the front and rear sections 81, 82 closer together by exerting on them a mutual contact force Fc that is lower than the return force Fr exerted by the return spring 71 of the operating rod 7.

In the preferred embodiments of the invention, as illustrated, the retention means comprise an elastic annular layer 16 axially subjected to the boost force Fa, this layer 16 having an axial thickness E and an inside diameter Di which are lower, the higher the boost force Fa.

Figure 2:
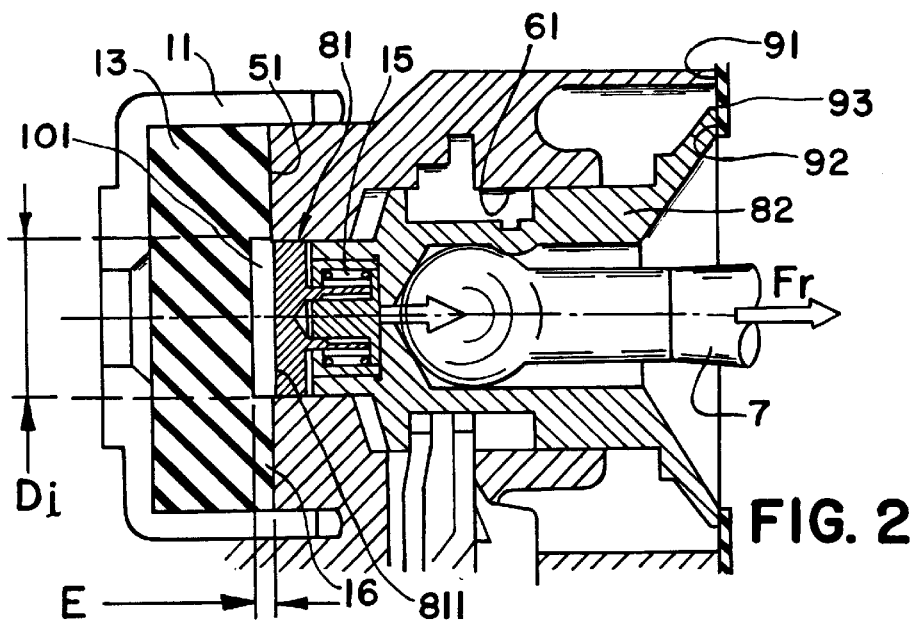
FIGS. 2, 3 and 4 are detailed sectioned views of part of the booster illustrated in FIG. 1, seen at various stages of operation.
Figure 3:
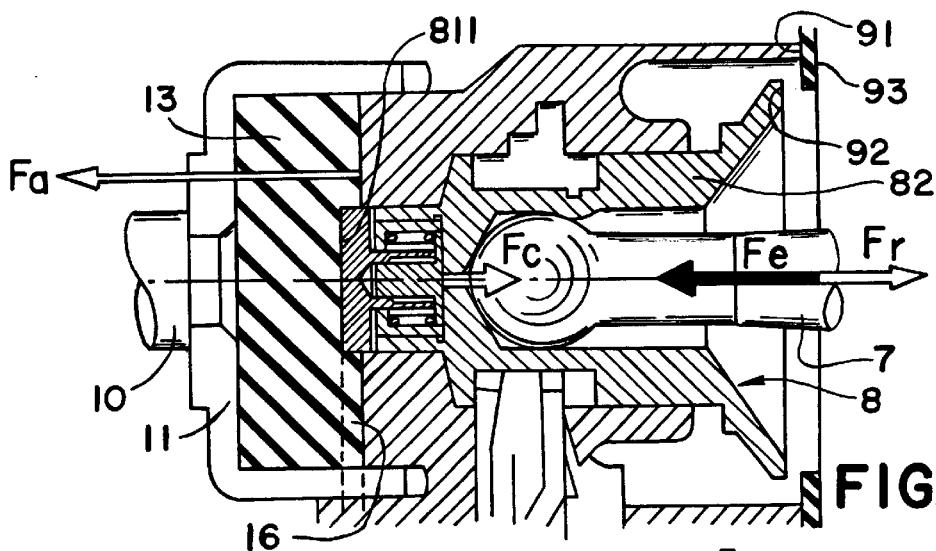
Figure 4:
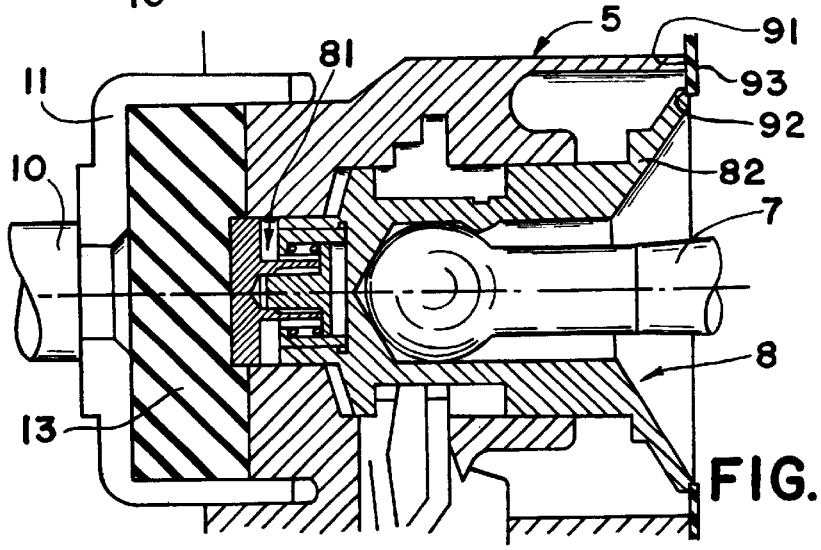

In the case of a booster that employs a reaction disc 13, as illustrated in FIGS. 2 to 4, the retention means also comprise, for example, a rigid disc 811 constituting a front face of the front section 81 of the plunger 8, the annular layer 16 in this case consisting of a thickening of the reaction disc 13 which delimits, in the reaction disc, a housing 101 capable of trapping the rigid disc 811 when the boost force Fa exceeds the determined threshold S while the operating rod is in its extreme actuating position, the housing 101 and the rigid disc 811 possibly having complementary frustoconical shapes.

The way in which the invention, as may be explained with reference to FIGS. 2 to 4, functions is as follows.

When the booster is at rest (FIG. 2), the operating rod 7 is pulled in the return direction X– by the force Fr exerted by the spring 71, which means that the moving annular seat 92 is pressed against the shutter 93.

Under these conditions, the rear chamber 4 communicates with the front chamber 3 and is isolated from atmospheric pressure Pa.

If an input force Fe which changes slowly (this state is not illustrated) is applied to the operating rod 7, the moving seat 92 moves slowly away from the shutter 93, and this opens the rear chamber 4 to the atmosphere and causes the plunger 8 to move in the actuating direction X+.

As, in this movement, the front face 51 of the plunger 8 is pressed on the periphery of the reaction disc 13, the central part of this disc, in which the housing 101 is formed, is pushed back in the return direction X– until it encounters the rigid disc 811, this central part of the reaction disc then exerting on the rigid disc 811 a reaction force that is directed in the opposite direction X–. The operating rod is therefore in an intermediate actuating position.

If, by contrast, an input force Fe that changes quickly (FIG. 3) is applied to the operating rod 7, the latter then adopts its extreme actuating position and the rigid disc 811 becomes inserted in the housing 101 before the pneumatic piston 5 has had time to press against the periphery of the reaction disc 13.

Under these conditions, when the pneumatic piston 5 presses on the annular layer 16 at the periphery of the reaction disc 13, this layer 16 is made to flow towards the centre of the reaction disc, reducing its inside diameter Di, and keeps the rigid disc 811 trapped in the housing 101.

When the brake pedal (not depicted) is released gradually, and although the input force Fe is reducing (FIG. 4), the rigid disc 811 remains trapped in the housing 101 as long as the seat 92 of the valve does not move the shutter 93 off the stationary seat 91, which means that maximum boost force continues to be applied to the master cylinder 20 during this phase of brake release.

In fact, the application of this boost force does not cease until the seat 92 of the valve has retreated far enough in the direction X– to move the shutter 93 off the stationary seat 91, the rear chamber 4 then being connected to the front chamber 3 again.

In the embodiment of FIGS. 5 to 8, the annular layer 16 is arranged between the front face 51 of the pneumatic piston 5 and the hydraulic cylinder 12, and the retention means comprise a shoulder 810 of the, at least partially cylindrical, external shape of the front section 81 of the plunger 8.

A rigid insert 17 may also be arranged in the elastic annular layer 16 to interact with the shoulder 810.

When the booster is at rest (FIG. 6), the operating rod 7 is pulled in the return direction X– by the force Fr exerted by the spring 71, which means that the moving annular seat 92 is pressed against the shutter 93. Under these conditions, which are identical to those illustrated in FIG. 2, the rear chamber 4 communicates with the front chamber 3 and is isolated from atmospheric pressure Pa.

If an input force Fe changing slowly (state not illustrated) is applied to the operating rod 7, the moving seat 92 moves slowly away from the shutter 93, and this opens the rear chamber 4 to the atmosphere. The operating rod is then in an intermediate actuating position.

The venting of the rear chamber 4 to atmosphere in turn causes the plunger 8 to move in the actuating direction X+ and correspondingly causes the reaction piston 14 to move in the return direction X–, this reaction piston then exerting on the front section 81 of the plunger 8 a reaction force directed in this same direction X–.

Figure 6:
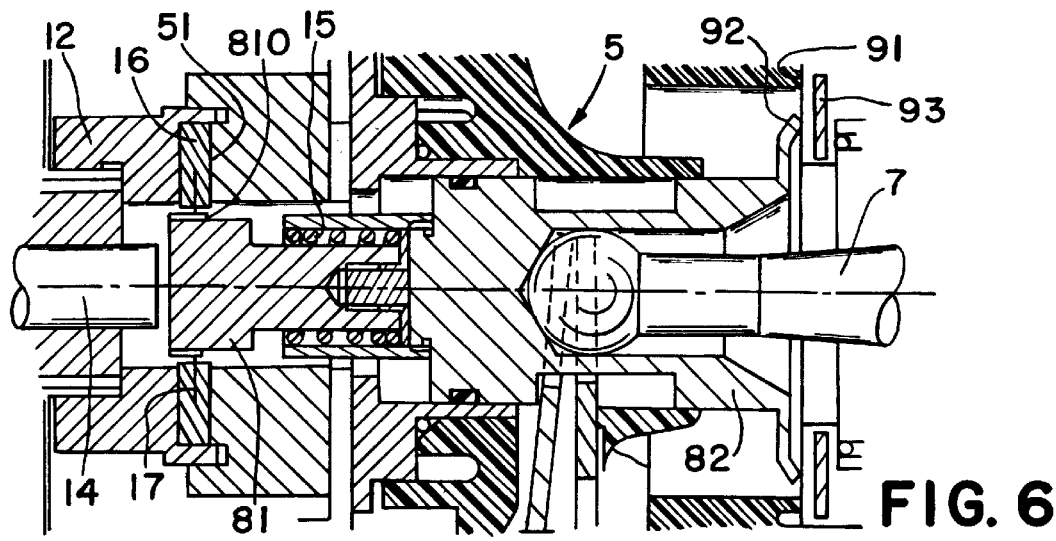
FIGS. 6, 7 and 8 are detailed sectioned views of part of the booster illustrated in FIG. 5, seen at various stages of operation.
Figure 7:
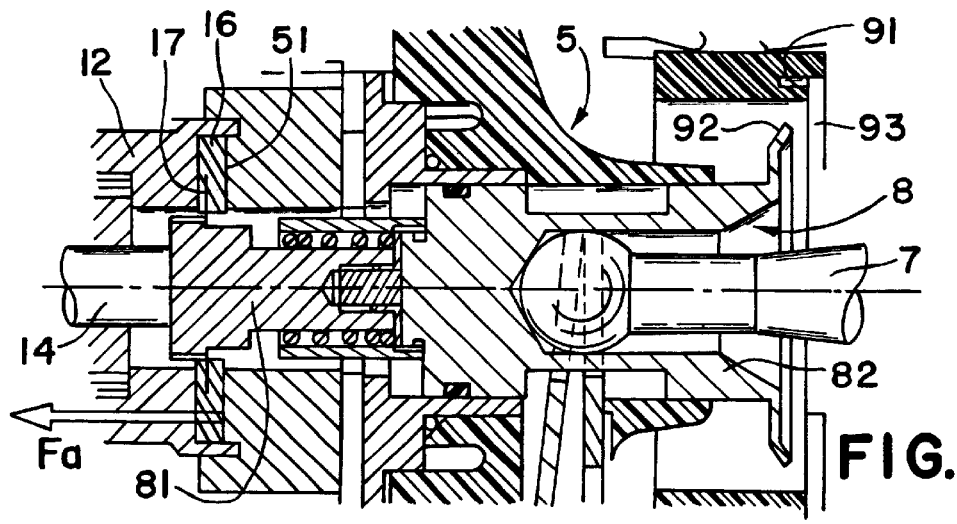
Figure 8:
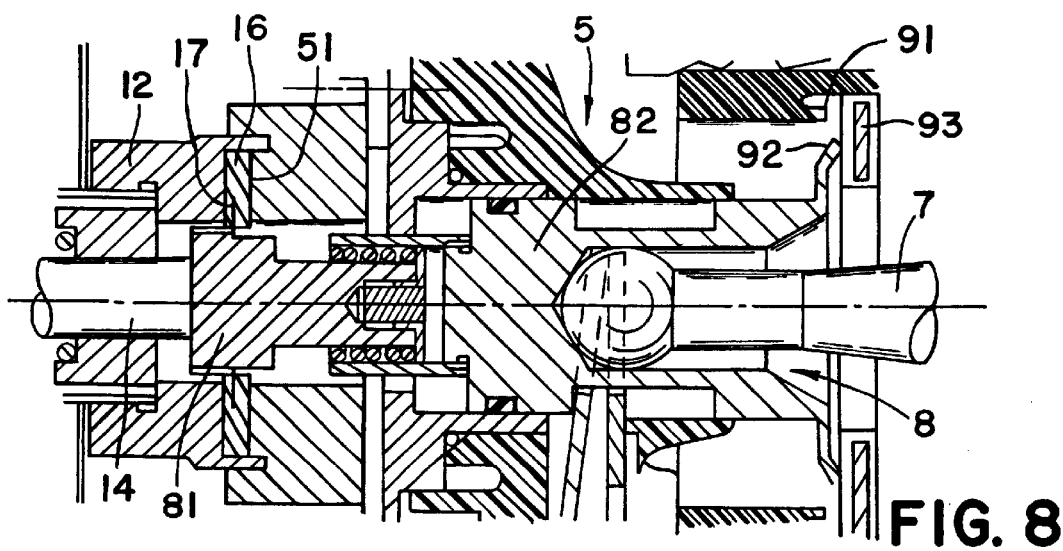

Bearing in mind the small relative movement of the plunger 8 compared with the pneumatic piston 5, the relative position of the shoulder 810 and of the annular layer 16 when the booster is in this state remains practically that illustrated in FIG. 6.

If, by contrast, an input force Fe that changes quickly (FIG. 7) is applied to the operating rod 7, the latter then adopts its extreme actuating position and the shoulder 810 becomes placed in front of the insert 17 before the pneumatic piston 5 has had time to press against the hydraulic cylinder 12 and therefore make the reaction piston 14 retreat.

Under these conditions, when the pneumatic piston 5 presses on the annular layer 16 (FIG. 7), this layer 16 is made to flow towards the shoulder 810, pushing the insert or each insert 17 back towards this shoulder and thus combining the front section 81 of the plunger 8 with the pneumatic piston 5 so that they move in translation as one.

When the brake pedal (not depicted) is released gradually, and although the input force Fe is reducing (FIG. 8), the shoulder 810 remains trapped by the insert or inserts 17 as long as the seat 92 of the valve has not moved the shutter 93 off the stationary seat 91, which means that a maximum boost force continues to be applied to the master cylinder 20 during this phase of brake release.

The application of this boost force does not cease until the seat 92 of the valve has retreated far enough in the direction X– to move the shutter 93 off the stationary seat 91, the rear chamber 4 then being connected to the front chamber 3 again.

Figure 9:
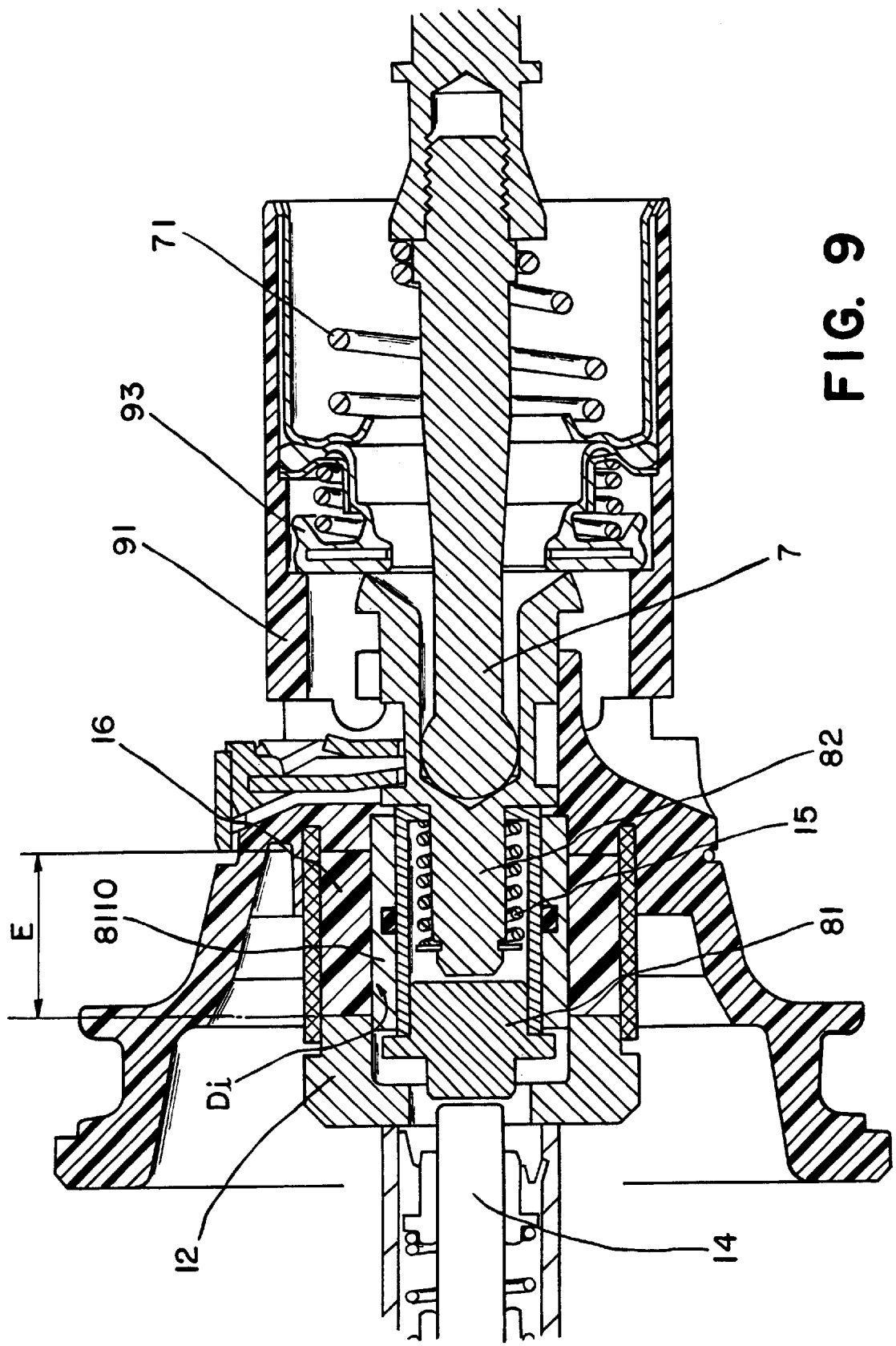
FIG. 9 is a sectional view of the rear part of a booster in accordance with a third embodiment of the invention.

In the embodiment of FIG. 9, the retaining means comprise a rigid sleeve 8110 arranged inside an elastic sleeve 16 which delimits a housing capable of trapping the rigid sleeve 8110 when the boost force Fa exceeds the determined threshold S while the operating rod 7 is in its extreme actuating position.

By virtue of the invention, it is thus possible to keep the valve 9 wide open for the greatest possible proportion of the brake release phase that follows an emergency braking operation, and therefore to continue to apply a braking force that is very much stronger than the one that would be obtained, without the invention, by the braking effort actually supplied by the driver.

What is claimed is:

1. A pneumatic brake-booster comprising: a rigid casing; a moving partition delimiting, in leaktight fashion, a front chamber and a rear chamber inside the casing, said front chamber in operation being subjected to a first pressure and said rear chamber being selectively connected to said front chamber or subjected to a second pressure higher than said first pressure; a pneumatic piston moving with said moving partition; an operating rod moving in said piston as a function of an input force selectively exerted in an axial actuating direction orientated towards said front chamber, and of a return force exerted by a main return spring in an axial return direction opposite of said axial actuating direction, said return force urging said operating rod into a return position, and an input force urging said operating rod into an intermediate actuating position or into an extreme actuating position, depending on whether an input force is applied at a rate that is lower or higher than a determined limiting rate; a plunger housed in said piston and driven along by said operating rod; a three-way valve having an annular seat borne by a rear section of said plunger, said three-way valve connecting said rear chamber to said front chamber when said operating rod is in a position of rest, said three-way valve subjecting said rear chamber to said second pressure when said operating rod is in an actuating position; force-transmission means capable of receiving and of transmitting at least a boost force exerted by a front face of said piston when said three-way valve subjects said rear chamber to the second pressure, said force-transmission means including reaction means capable of reacting against said input force with a reaction force dependent on said boost force, characterized in that said plunger comprises a front section connected to the rear section by a secondary spring exerting, between the front and rear sections, a mutual-contact force that is lower than the return force, and in that the front section and the force-transmission means respectively comprise a reversible retention means capable of securing said front section to the piston when a boost force exceeds a determined threshold while said operating rod is in an extreme actuating position.

2. The booster according to claim 1, characterized in that said retention means comprise an elastic annular layer axially subjected to the boost force, said layer having an axial thickness and an inside diameter which are smaller, the higher said boost force.

3. The booster according to claim 2, characterized in that said reaction means comprise a reaction disc made of elastomeric material, in that said retention means comprise a rigid disc constituting a front face of said front section of said plunger, and in that said annular layer consists of a thickening of said reaction disc which delimits, in said reaction disc, a housing capable of trapping a rigid disc when a boost force exceeds a determined threshold while said operating rod is in an extreme actuating position.

4. The booster according to claim 3, characterized in that said housing and the rigid disc have complementary frustoconical shapes.

5. The booster according to claim 1, characterized in that said front section has an at least partially cylindrical external shape, and in that said retention means comprise a shoulder with an external shape of said front section.

6. The booster according to claims 2, characterized in that said retention means comprise a rigid insert located in said elastic annular layer which interacts with a shoulder with an external shape of said front section in order to combine said front section with said piston when a boost force exceeds a determined threshold while the operating rod is in an extreme actuating position.

7. The booster according to claims 5, characterized in that said retention means includes a rigid insert located in said elastic annular layer which interacts with a shoulder with an external shape of said front section in order to combine said front section with said piston when a boost force exceeds a determined threshold while the operating rod is in an extreme actuating position.

* * * * *